United States Patent
Wong et al.

[19]

[11] Patent Number: 6,101,059
[45] Date of Patent: Aug. 8, 2000

[54] SYNCHRONIZED READ/WRITE HEADS FOR DOUBLE SIDED TAPE RECORDING

[75] Inventors: Patrick K. Wong, Louisville; Shiba P. Panda, Englewood, both of Colo.

[73] Assignee: Storage Technology Corporation, Louisville, Colo.

[21] Appl. No.: 09/067,718

[22] Filed: Apr. 28, 1998

[51] Int. Cl.[7] .................................................. G11B 21/04
[52] U.S. Cl. .................... 360/70; 360/77.12; 360/72.2; 360/61; 360/31; 360/73.04
[58] Field of Search ................. 360/72.2, 53, 77.12, 360/95, 130.21, 63, 61, 70, 51, 31, 73.04

[56] References Cited

U.S. PATENT DOCUMENTS 5,057,949  10/1991  Suga et al. ................................. 360/70
5,262,908  11/1993  Iwamatsu et al. .................... 360/77.12
5,293,285   3/1994  Leonhardt et al. .
5,995,315  11/1999  Fasen ................................... 360/77.01

*Primary Examiner*—Paul Loomis
*Assistant Examiner*—Dan I. Davidson
*Attorney, Agent, or Firm*—Brooks & Kushman P.C.

[57] ABSTRACT

Tape drives and methods for reading/writing on first and second surfaces of a tape include a pair of read/write heads for reading/writing on the surfaces at the same time in synchronism as the tape moves across the heads. A controller determines if the heads are reading corresponding portions of the surfaces of the tape at the same time. The controller also determines if the heads are moving to corresponding portions of the surfaces of the tape in the same time period. The controller further determines if the heads are moving to corresponding tracks on the surfaces of the tape at the same time.

20 Claims, 4 Drawing Sheets

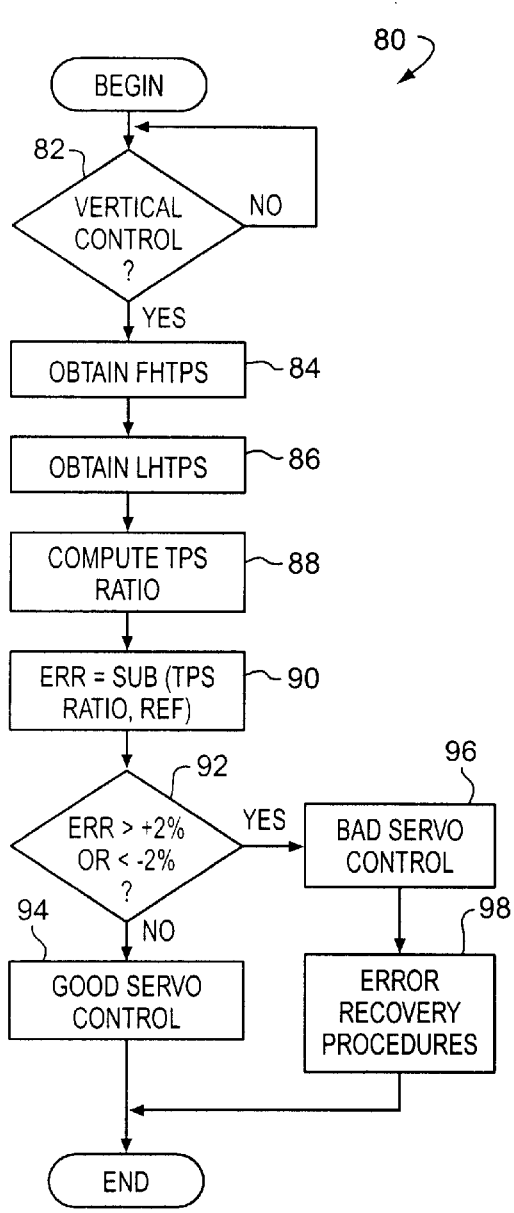
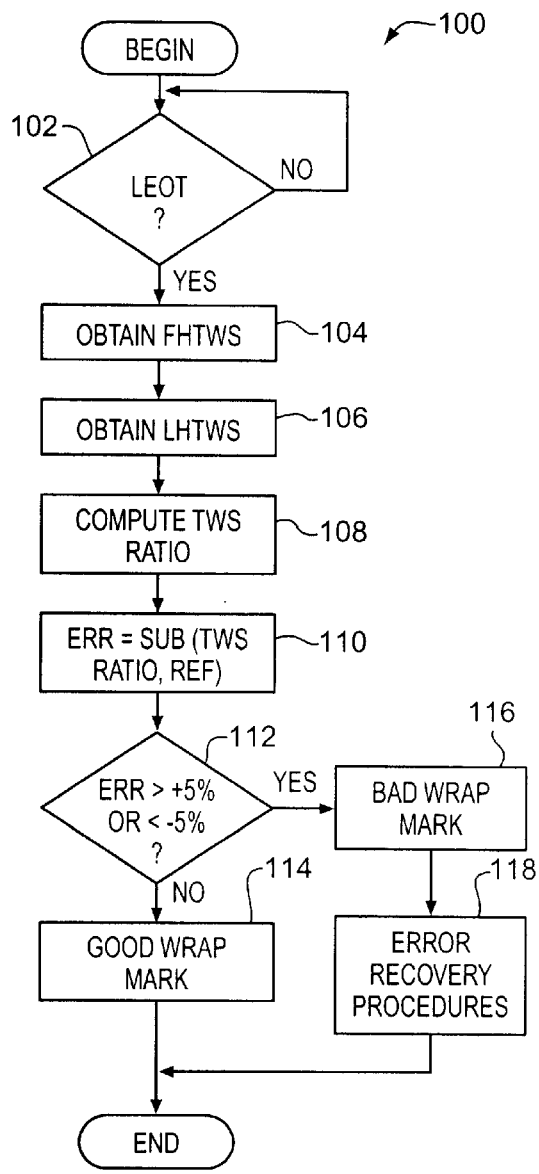
FIG. 4    FIG. 5

SYNCHRONIZED READ/WRITE HEADS FOR DOUBLE SIDED TAPE RECORDING

TECHNICAL FIELD

The present invention relates generally to magnetic recording and, in particular, to an apparatus and method for reading and writing data on both sides of a two sided magnetic tape.

BACKGROUND ART

Storing the maximum amount of data on the minimum amount of media and reading and writing data on the media at a maximum rate are goals of the data processing industry. Magnetic tape is commonly used as the media because it is inexpensive and provides significant data storage capacity per unit volume. Improvements in magnetic recording have increased the track and bit recording density for magnetic tape thereby maximizing the number of bits stored per square inch of tape. Further improvements in the recording density of magnetic tape are increasingly difficult to attain due to the need for accurate alignment of the tape with the read/write head to read the data written on the tape from data tracks of the tape. Any misalignment of the data tracks of the magnetic tape with the read/write head causes errors in the data read from and written to the tape.

Using both sides of magnetic tape doubles the data storage capacity of the tape. Two sided (double sided) tape recording has been disclosed in U.S. Pat. No. 5,293,285, which is hereby incorporated by reference.

Two situations need to be considered for two sided tape recording. The first situation is reading and writing on only one side of the magnetic tape at a time. The second situation is reading and writing on both sides of the magnetic tape simultaneously.

In the first situation, data tracks having data blocks are on only one side of the magnetic tape. Thus, the symmetry of the data blocks on both sides of the magnetic tape is not required. In the second situation, data tracks having data blocks are on both sides of the magnetic tape. As a result, the symmetry of data blocks on both sides of the magnetic tape is required for data integrity and data search. In essence, the data blocks must be read from and written to both sides of the tape in a proper order to ensure that the data is usable.

For the second situation, prior art apparatus and methods for two sided recording generally employ a pair of read/write heads. One of the pair of read/write heads is positioned on one side of the magnetic tape and the other one of the pair of read/write heads is positioned on the other side of the tape. Reading from and writing to both sides of the magnetic tape simultaneously with the pair of read/write heads doubles the data transfer rate.

A problem with prior art two sided recording apparatus and methods for the second situation is that the read/write heads must be synchronized properly with each other. This means that the read/write heads must be turned on and off at the same time so that data is written to and read from both sides of the tape in the proper order. Thus, when one read/write head is reading and writing part of a data block at a predetermined area on one side of the tape the other read/write head must be reading and writing the other part of the data block on a corresponding predetermined area on the other side of the tape. In essence, read/write head synchronization means that the pair of read/write heads are performing corresponding actions on corresponding positions of both sides of the tape simultaneously.

Synchronization affects the symmetry of the data blocks on both sides of the magnetic tape. When the read/write heads are not synchronized, reading and writing of part of a data block on one side of the tape is either too fast or too slow as compared to the reading and writing of the other part of the data block on the other side of the tape. This violates the symmetry of the data blocks and data integrity is not preserved.

What is needed is a tape drive and method for reading and writing on double sided tape with a pair of synchronized read/write heads.

SUMMARY OF THE INVENTION

Accordingly, it is an object of the present invention to provide a tape drive having a pair of read/write heads for reading/writing on the surfaces of a tape at the same time in synchronism as the tape moves across the heads.

It is another object of the present invention to provide a tape drive having a pair of read/write heads which determines if the heads are reading corresponding portions of the surfaces of the tape at the same time.

It is a further object of the present invention to provide a tape drive having a pair of read/write heads which determines if the heads move to corresponding portions of the surfaces of the tape in the same time period.

It is still another object of the present invention to provide a tape drive having a pair of read/write heads which determines if the heads move to corresponding tracks on the surfaces of the tape at the same time.

In carrying out the above objects and other objects, the present invention provides a tape drive for reading a tape having first and second surfaces. The tape drive includes a first head for reading a first gap mark on the first surface of the tape. The first gap mark has a predetermined length and is located at a predetermined position on the first surface of the tape. The tape drive also includes a second head for reading a second gap mark on the second surface of the tape. The second gap mark has the predetermined length and is located at a predetermined position on the second surface of the tape. The predetermined position of the second gap mark corresponds to the predetermined position of the first gap mark.

The tape drive further includes a controller for controlling the heads to read the tape at the same time in synchronism as the tape moves across the heads The controller determines if a difference in the time required for the heads to read the gap marks is within an acceptable range indicative of the heads reading corresponding portions of the surfaces of the tape at the same time.

In carrying out the above objects and other objects, the present invention further provides a tape drive for reading/writing on tracks of a tape having first and second surfaces. The tracks are spaced apart laterally across the tape. The tape drive includes a first read/write head for reading/writing a first gap mark having a predetermined length at a predetermined position on a track on the first surface of the tape. The tape drive also includes a second read/write head for reading/writing a second gap mark having the predetermined length at a predetermined position on a track on the second surface of the tape. The predetermined position of the second gap mark corresponds to the predetermined position of the first gap mark.

The tape drive further includes a controller for controlling the read/write heads to write on and then read from the tape at the same time in synchronism as the tape moves across the heads. The controller determines if a difference in the time required for the read/write heads to read the gap marks after the read/write heads have written the gap marks is within an acceptable range indicative of the read/write heads writing on and then reading from corresponding portions of the surfaces of the tape at the same time.

In accordance with the above described tape drives, methods for reading/writing on a tape having first and second surfaces is also disclosed.

The advantages accruing to the present invention are numerous. The synchronization method of the present invention detects faulty tape recording and the symmetry of data blocks, gap marks, and wrap marks on both sides of the magnetic tape when read/write heads on both sides of the tape are enabled at the same time. The synchronization method assures data integrity and data search for double sided tape recording, detects bad tape media, recovers data from out of specification tape media, and detects head alignment problems. The synchronization method allows the practical use of two sided recording thereby doubling the storage capacity and data transfer rate of typical single sided applications.

These and other features, aspects, and embodiments of the present invention will become better understood with regard to the following description, appended claims, and accompanying drawings.

BRIEF DESCRIPTION OF THE DRAWINGS

FIG. 4 is a flow diagram representing operation of track position synchronization of the read/write heads of the magnetic tape drive;

FIG. 5 is a flow diagram representing operation of track wrapping synchronization of the read/write heads of the magnetic tape drive;

BEST MODES FOR CARRYING OUT THE INVENTION

Figure 1A:
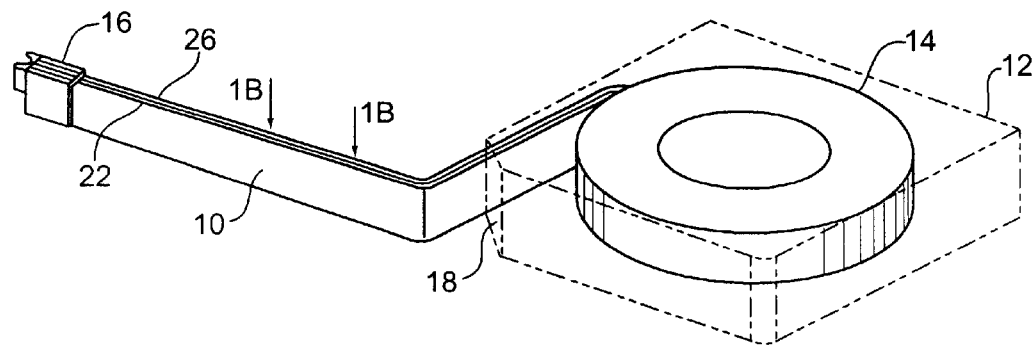
FIGS. 1A and 1B illustrate magnetic tape and a magnetic tape cartridge in accordance with the present invention.
Figure 1B:
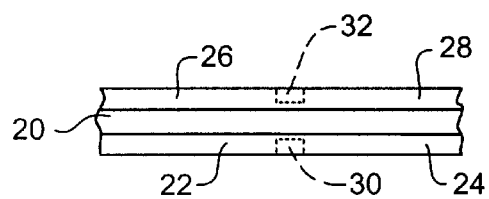

Referring now to FIGS. 1A and 1B, magnetic tape 10 of a magnetic tape cartridge 12 is shown. Magnetic tape 10 is wound on a supply reel 14 that is rotatable mounted within magnetic tape cartridge 12. One end of magnetic tape 10 is affixed to a leader block 16. Leader block 16 is positioned juxtaposed to an opening 18 in one corner of magnetic tape cartridge 12 when the tape is rewound on supply reel 14.

FIGS. 1A and 1B illustrate both a perspective view and a cross-sectional view of magnetic tape 10. Magnetic tape 10 consists of a mylar substrate 20 on which has been deposited two recording surfaces. The two recording surfaces consist of a first layer of magnetic material 22 on a first side 24 of substrate 20 and a second layer of magnetic material 26 on a second side 28 of the substrate. During the write process the regions of magnetization 30 and 32 formed in magnetic tape 10 do not extend completely through layers 22 and 26 and do not penetrate substrate 20.

Figure 2:
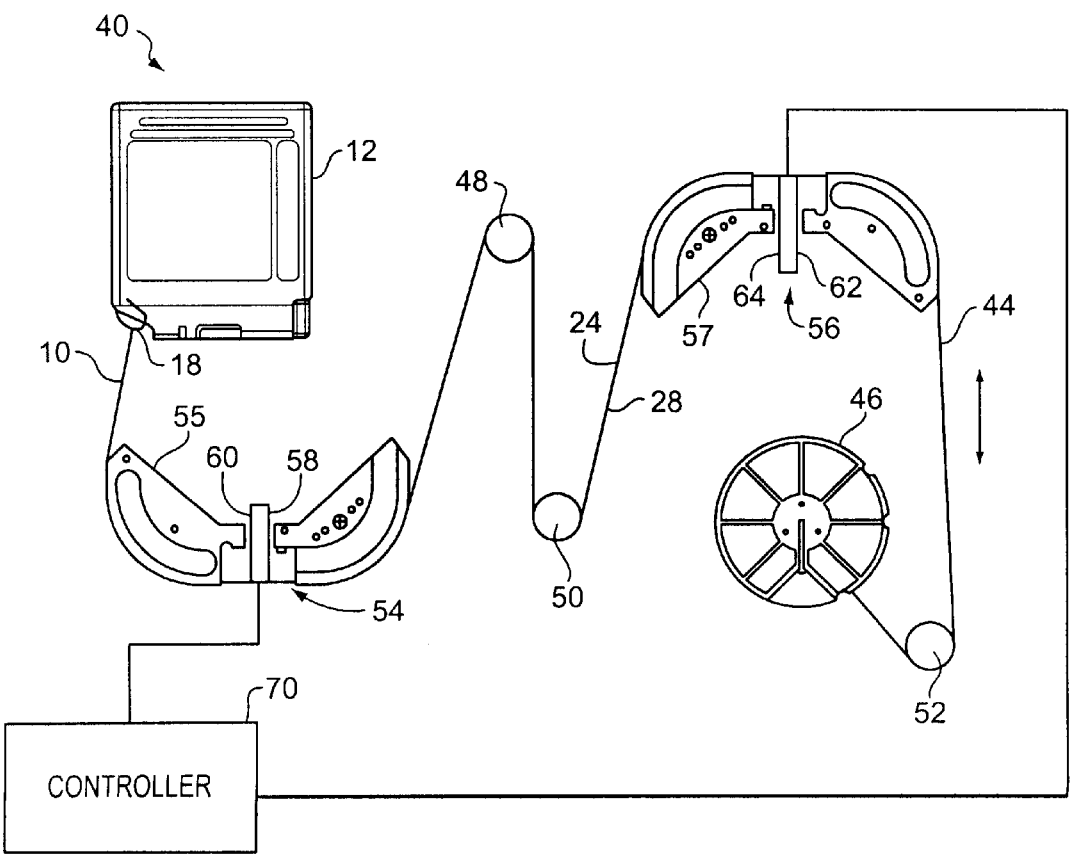
FIG. 2 illustrates a magnetic tape drive having a pair of read/write heads in accordance with the present invention.

Referring now to FIG. 2, a magnetic tape drive 40 for reading and writing data on magnetic tape 10 is shown. A tape cartridge slot accepts magnetic tape cartridge 12. A tape threading arm (not shown) extracts leader block 16 and the attached magnetic tape 10 from magnetic tape cartridge 12 to thread the magnetic tape along tape path 44 to take-up reel 46. Tape guides 48, 50, and 52 are positioned along tape path 44 guide magnetic tape 10 along the tape path.

Magnetic tape drive 40 further includes a first set of movable read/write heads 54 positioned between air bearings 55 and a second set of movable read/write heads 56 positioned between air bearings 57. Read/write heads 54 include a read head 58 and a write head 60. Similarly, read/write heads 56 include a read head 62 and a write head 64. Read/write heads 54 and 56 are positioned along tape path 44 to be on opposite sides 24 and 28 of magnetic tape 10. Specifically, read/write heads 54 read and write data to first side 24 of magnetic tape 10 and read/write heads 56 read and write data to second side 28 of the magnetic tape. Each of read/write heads 54 and 56 may consist of a stack of read/write elements (not specifically shown) spaced apart at regular intervals to span a portion of the width of magnetic tape 18. For instance, each read/write head may have eighteen read elements and eighteen write elements.

A controller 70 controls read/write heads 54 and 56 to read data from and write data to magnetic tape 10. Controller 70 is operable to move read/write heads 54 and 56 to control the reading and writing of data on specific tracks on magnetic tape 10. Controller 70 is further operable with magnetic tape drive 40 to control the speed and direction of movement of magnetic tape 10.

For double sided tape reading applications, read/write heads 54 transmit a first read signal to controller 70 when reading from a track on first side 24 of magnetic tape 10. Similarly, read/write heads 56 transmit a second read signal to controller 70 when reading from a corresponding track on second side 28 of magnetic tape. Controller 70 puts the data read from the two sides of magnetic tape 18 in a usable format. Read/write heads 54 and 56 must read corresponding portions of sides 24 and 28 of magnetic tape 10 at the same time in synchronism to enable controller 70 to put the data in the usable format.

For double sided tape writing applications, controller 70 transmits a first write signal to read/write heads 54 to write data on a track on first side 24 of magnetic tape 10. Similarly, controller 70 transmits a second write signal to read/write heads 56 to write data on a corresponding track on second side 28 of magnetic tape. Controller 70 transmits the first and second write signals to read/write heads 54 and 56 in a predetermined pattern to ensure that the data can be read from the two sides of magnetic tape 18 in a usable format. Read/write heads 54 and 56 must write data to corresponding portions of sides 24 and 28 of magnetic tape 10 at the same time in synchronism to enable data to be read later and put in the usable format.

Figure 3A:
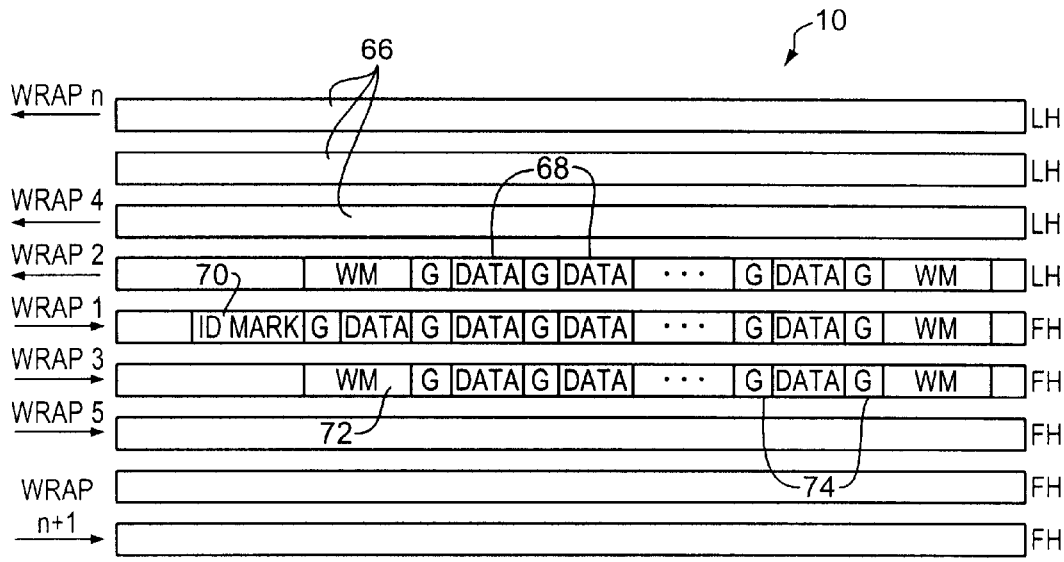
FIGS. 3A and 3B illustrate an exemplary tape format of the first and second surfaces of the magnetic tape.
Figure 3B:
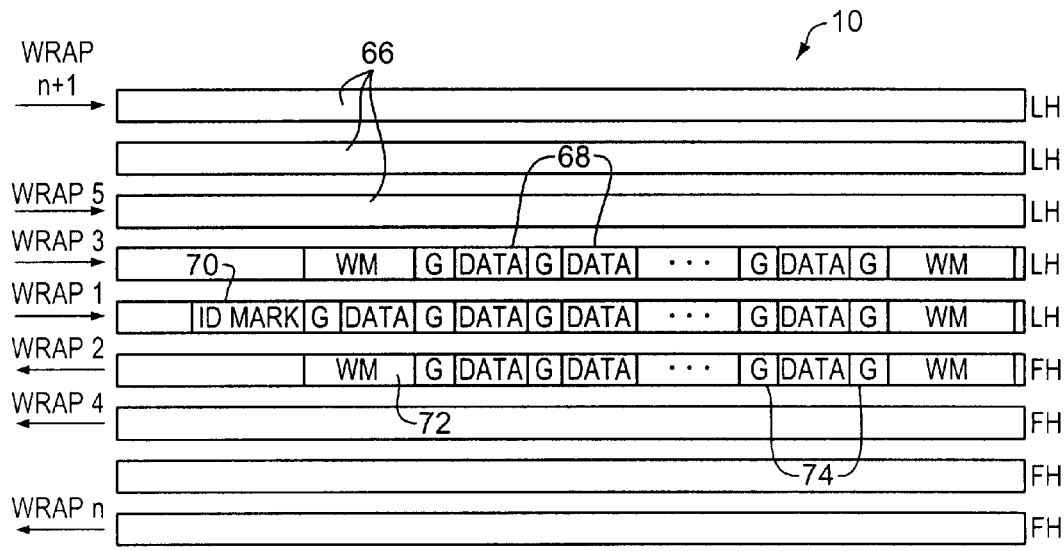

Referring now to FIGS. 3A and 3B, the tape format of first and second sides 24 and 28 of magnetic tape 10 in accordance with the present invention is shown. Each of sides 24 and 28 includes a plurality of tracks or wraps 66. For instance, each of sides 24 and 28 may have 144, 288, or 576 tracks for high density tape recording. Tracks 66 extend longitudinally along magnetic tape 10 and are spaced apart from one another laterally across the magnetic tape. Data blocks 68 and servo marks such as identification mark 70, wrap mark 72, and gap mark 74 are stored on tracks 66.

Identification mark 70 identifies the particular track on which it is located. Wrap mark 72 identifies the logical and/or physical beginning and/or end of the particular track on which it is located. Gap mark 74 is positioned between data blocks to separate the data blocks and to write over bad areas of magnetic tape 10. Each data block 68 on one side of magnetic tape 10 corresponds to one data block on data block on the other side of the tape.

Synchronization between read/write heads 54 and 56 is required to ensure that data is being read from and written to magnetic tape 10 properly. As will be now be described, controller 70 monitors read/write heads 54 and 56 to determine if they are reading and writing corresponding portions of sides 24 and 28 at the same time in synchronism as magnetic tape 10 moves across the read/write heads. If read/write heads 54 and 56 are not synchronized, controller 70 adjusts at least one of the position of the read/write heads, the position of magnetic tape 10, and the speed and direction of movement of the magnetic tape to ensure that the read/write heads are synchronized.

Track Position Synchronization

Read/write heads 54 and 56 must move to corresponding portions of sides 24 and 28 at the same time within the same time period or else the symmetry of data blocks on the sides of the magnetic tape will be jeopardized. Lateral position misalignment between read/write heads 54 and 56 needs to be detected and adjusted for positioning the read/write heads on the same set of corresponding data tracks on first and second sides 24 and 28 of magnetic tape 10.

Referring now to FIG. 4, a flow diagram 80 representing operation of magnetic tape drive 40 for track position synchronization of read/write heads 54 and 56 is shown. For descriptive purposes, read/write head 54 will now be referred to as leading head 54 and read/write head 56 will be referred to as following head 56.

Initially, controller 70 controls leading and following heads 54 and 56 to move laterally across magnetic tape 10 from an initial position to an assigned position as shown in block 82. Controller 70 enables a timer LHTPS for leading head 54 and a timer FHTPS for following head 56 as they start to move from their initial positions. Controller 70 stops the timer FHTPS when following head 56 moves to its assigned position as shown in block 84. Similarly, controller 70 stops the timer LHTPS when leading head 54 moves to its assigned position as shown in block 86. Controller 70 then computes the ratio TPS of the timers FHTPS and LHTPS as shown by block 88. Controller 70 then computes the error TPS between leading head 54 and following head 56 as shown by block 90. The error TPS is equal to the ratio TPS multiplied by 100%. The error TPS indicates the difference in the amount of time that leading head 54 and following head 56 need to move to corresponding portions on sides 24 and 28 of magnetic tape 10.

Controller 70 then determines if the error TPS is within an acceptable range as shown by block 92. For instance, if the error TPS is within +2% or −2% of the ratio TPS, then leading and following heads 54 and 56 are moving to corresponding positions of sides 24 and 28 of magnetic tape 10 in the same time period. Thus, leading and following heads 54 and 56 are synchronized with respect to track positioning as shown by block 94. If the error TPS is greater than the acceptable range, then controller 70 invokes an error recovery procedure to handle the fault as shown by blocks 96 and 98. The fault indicates that the time period for movement of one head to the assigned position from the initial position on one side of the tape is longer or shorter than the time period for movement of the other head to the assigned position from the initial position on the other side of the tape. Controller 70 may remedy the problem by taking into account the time difference when moving leading and following heads 54 and 56.

Track Wrapping Synchronization

Leading and following heads 54 and 56 must turn around and move to the next assigned data track at the same time or else the symmetry of data blocks on first and second sides 24 and 28 of magnetic tape 10 will be jeopardized. Track wrapping synchronization is essential for high-density tape recording in which the number of tracks on magnetic tape 10 is greater than the number of read/write elements of leading and following heads 54 and 56. During a high-density recording, the read/write operation is started at a Begin of Tape (BOT) mark. Instead of stopping at an End of Tape (EOT) mark, the read/write operation continues by moving leading and following heads 54 and 56 vertically to the next set (or wrap) of tracks 66 on magnetic tape 10. Magnetic tape 10 is then rotated in an opposite direction.

Referring now to FIG. 5, a flow diagram 100 representing operation of magnetic tape drive 40 for track wrapping synchronization of leading and following heads 54 and 56 is shown. Initially, when a Logical End of Tape (LEOT) mark is detected as shown in block 102, controller 70 enables a timer FHTWS for following head 56 and a timer LHTWS for leading head 54. Controller 70 stops the timer FHTWS when following head 56 detects a wrap mark past the LEOT mark as shown by block 104. Similarly, controller 70 stops the timer LHTWS when leading head 54 detects the wrap mark as shown by block 106. Controller 70 then computes the ratio TWS of the timers FHTWS and LHTWS as shown by block 108. Controller 70 then computes the error TWS between leading head 54 and following head 56 as shown by block 110. The error TWS is equal to the ratio TWS multiplied by 100%. The error TWS indicates the difference in the amount of time that leading following heads 54 and 56 need to move to the wrap mark after detecting the LEOT mark.

Controller 70 then determines if the error TWS is within an acceptable range as shown by block 112. For instance, if the error is within +5% or −5% of the ratio TWS, then leading and following heads 54 and 56 are synchronized with respect to track wrapping as shown by block 114. If the error TWS is greater than the acceptable range, then controller 70 invokes an error recovery procedure to handle the fault as shown by blocks 116 and 118. The fault indicates that the time for movement to a track by one head on one side of magnetic tape 10 takes longer or shorter than the time for movement to a corresponding track by the other head on the other side of the tape.

Gap Position Synchronization

Leading and following heads 54 and 56 must read and write gap marks having equal lengths on corresponding portions of first and second sides 24 and 28 of magnetic tape 10 at the same time or else the symmetry of the data blocks on the magnetic tape will be jeopardized. Gap marks separate data blocks and cover bad tape areas. When one side of magnetic tape 10 needs to have a gap mark to cover a bad tape area, the other side of the magnetic tape needs to have a gap mark of the same size for the data blocks on both sides to be symmetrical. Misalignment of the gap position synchronization needs to be detected and adjusted for writing the same size of gap marks and data blocks.

Figure 6:
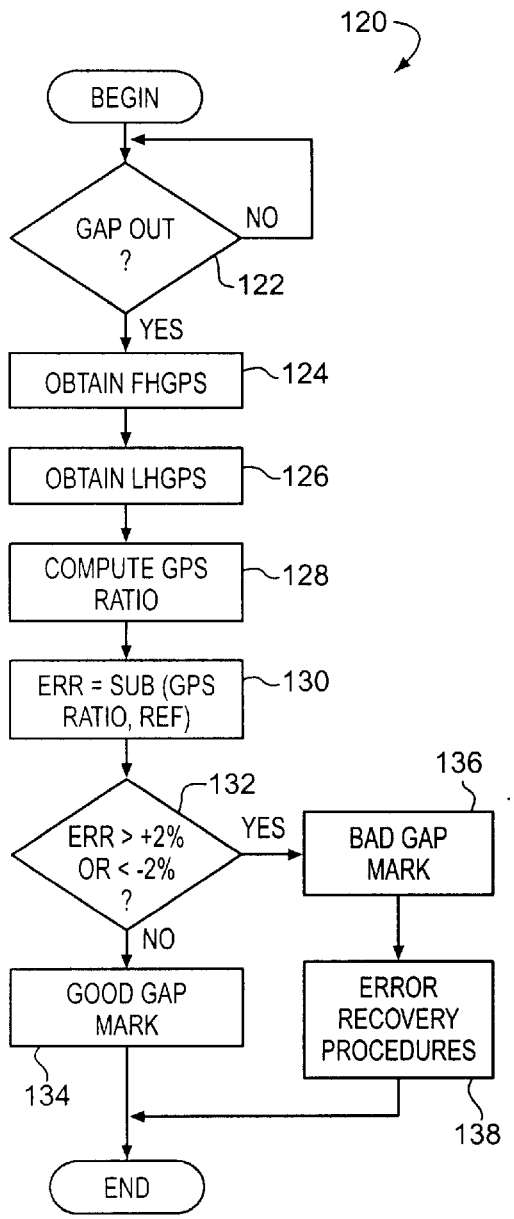
FIG. 6 is a flow diagram representing operation of gap position synchronization of the read/write heads of the magnetic tape drive.

Referring now to FIG. 6, a flow diagram 100 representing operation of magnetic tape drive 40 for gap position synchronization of leading and following heads 54 and 56 is shown.

Initially, controller 70 enables a timer LHGPS when leading head 54 starts writing an LH gap mark on first side 24 of magnetic tape 10 and enables a timer FHGPS when following head 56 starts writing an FH gap mark on second side 28 of the magnetic tape. Controller 70 stops the timer LHGPS and the timer FHGPS when a gap out signal indicating a completion of the LH gap mark and FH gap mark is detected during read back checking as shown by block 122. Controller 70 then obtains the timer FHGPS and the timer LHGPS as shown by blocks 124 and 126. Controller 70 then computes the ratio GPS of the timers FHGPS and LHGPS as shown by block 128. Controller 70 then computes the error GPS between leading head 54 and following head 56 as shown by block 130. The error GPS is equal to the ratio GPS multiplied by 100%. The error GPS indicates that the completion of the gap mark on one side of magnetic tape 10 is faster or later than the completion of the gap mark on the other side of the magnetic tape. As a result, the sizes of the gap marks are different.

Controller 70 then determines if the error GPS is within an acceptable range as shown by block 132. For instance, if the error GPS is within +2% or −2% of the ratio GPS, then the size of the gap marks is substantially similar as shown by block 134. If the error GPS is greater than the acceptable range limit, then controller 70 invokes an error recovery procedure to handle the fault as shown by blocks 136 and 138.

Velocity Synchronization

Leading and following heads 54 and 56 must read and write gap marks and data blocks on first and second sides 24 and 28 of magnetic tape 10 at the same rate or else the symmetry of data blocks on the magnetic tape will be jeopardized. Misalignment of the velocity synchronization needs to be detected and adjusted for reading and writing the same size gap marks and data blocks.

Figure 7:
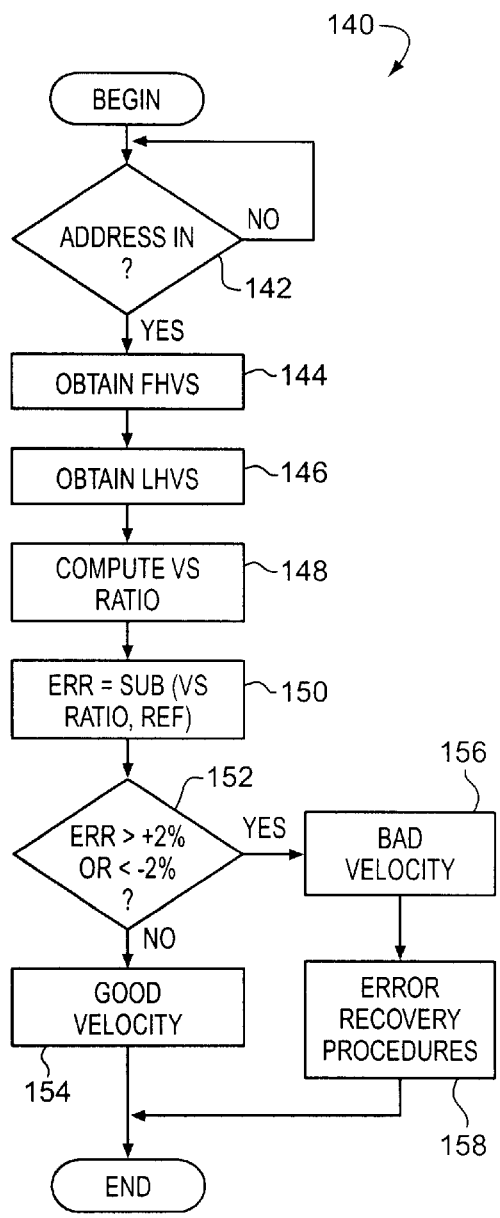
FIG. 7 is a flow diagram representing operation of velocity synchronization of the read/write heads of the magnetic tape drive.

Referring now to FIG. 7, a flow diagram 100 representing operation of magnetic tape drive 40 for velocity synchronization of leading and following heads 54 and 56 is shown.

Initially, controller 70 enables a timer LHVS and a timer FHVS when magnetic tape 10 moves at a constant speed. Controller 70 stops the timer LHVS when leading head 54 detects a gap mark and stops the timer FHVS when following head 56 detects a gap mark as shown by block 142. Controller 70 then obtains the timer FHVS and the timer LHVS as shown by blocks 144 and 146. Controller 70 then computes the ratio VS of the timers FHVS and LHVS as shown by block 148. Controller 70 then computes the error VS between leading head 54 and following head 56 as shown by block 150. The error VS is equal to the ratio VS multiplied by 100%. The error VS indicates that the time for detection of the gap mark on one side of magnetic tape 10 is different than the time for detection of the gap mark on the other side of the magnetic tape.

Controller 70 then determines if the error VS is within an acceptable range as shown by block 152. For instance, if the error VS is within +2% or −2% of the ratio VS, then the size of the gap marks and data blocks is substantially similar as shown by block 154. If the error VS is greater than the acceptable range, then controller 70 invokes an error recovery procedure to handle the fault as shown by blocks 156 and 158.

During a low-density tape recording, a read/write operation is started at the Beginning of Tape (BOT) mark and stopped at the End of Tape (EOT) mark. In a low-density tape recording, the number of tracks on magnetic tape 10 is the same as the number of elements in each of the read/write heads and the heads are fixed on both sides of magnetic tape 10. Thus, wrap marks are not needed and TPS and TWS are not required for low-density tape recording. However, TPS is required if the position tracks are included for better positioning and the read/write heads can laterally move across magnetic tape 10. In both cases, GPS is required for writing symmetrical data blocks and gap marks on both sides of magnetic tape 10. VS assures stability of the tape recording system.

In a high-density tape recording, magnetic tape 10 has more tracks than the number of read/write elements in each of the read/write heads. During a high-density tape recording, the read/write operation is started at BOT mark. Instead of stopping at the EOT mark, the read/write operation continues by moving read/write heads laterally across magnetic tape 10 to the next set (or wrap) of tracks on the magnetic tape and then rotating the tape in the opposite direction. TPS, TWS, and GPS are required for writing symmetrical data blocks and gap marks on both sides of magnetic tape 10. VS assures stability of the tape recording system.

Thus it is apparent that there has been provided, in accordance with the present invention, a tape drive and method for reading and writing on double sided tape with a pair of synchronized read/write heads that fully satisfy the objects, aims, and advantages set forth above.

While the present invention has been described in conjunction with specific embodiments thereof, it is evident that many alternatives, modifications, and variations will be apparent to those skilled in the art in light of the foregoing description. For instance, the teachings of the present invention are applicable to other types of double sided media such as optical media.

What is claimed is:

1. A tape drive for reading a tape having first and second surfaces, the tape drive comprising:

a first head for reading a first gap mark on the first surface of the tape, wherein the first gap mark has a predetermined length and is located at a predetermined position on the first surface of the tape;

a second head for reading a second gap mark on the second surface of the tape, wherein the second gap mark has the predetermined length and is located at a predetermined position on the second surface of the tape, wherein the predetermined position of the second gap mark corresponds to the predetermined position of the first gap mark; and a controller for controlling the heads to read the tape at the same time in synchronism as the tape moves across the heads, wherein the controller determines if a difference in the time required for the heads to read the gap marks is within an acceptable range indicative of the heads reading corresponding portions of the surfaces of the tape at the same time.

2. The tape drive of claim 1 wherein:

the first head is positioned proximate to the first surface of the tape and the second head is positioned proximate to the second surface of the tape.

3. The tape drive of claim 1 wherein:

the controller indicates a fault condition if the difference in the time required to read the gap marks is outside of the acceptable range.

4. The tape drive of claim 1 wherein:

the first and second surfaces of the tape include track identification marks located at corresponding positions, wherein the controller controls the heads to move laterally across the surfaces of the tape to the corresponding positions at the same time, wherein the controller determines if a difference in the time required for the heads to read the track identification marks is within an acceptable range indicative of the heads moving to corresponding portions of the surfaces of the tape in the same time period.

5. The tape drive of claim 4 wherein:
the controller indicates a fault condition if the difference in time required for the heads to read the track identification marks is within an acceptable range.

6. The tape drive of claim 1 wherein:
the first and second surfaces of the tape include wrap marks and End of Tape (EOT) marks located at corresponding positions, wherein the controller determines if a difference in the time required for the heads to read the wrap marks after the heads have read the EOT marks is within an acceptable range indicative of the heads moving to corresponding tracks on the surfaces of the tape at the same time.

7. The tape drive of claim 6 wherein:
the controller indicates a fault condition if the difference in the time required for the heads to read the wrap marks after the heads have read the EOT marks is outside of the acceptable range.

8. A tape drive for reading/writing on tracks of a tape having first and second surfaces, wherein the tracks are spaced apart laterally across the tape, the tape drive comprising:
a first read/write head for reading/writing a first gap mark having a predetermined length at a predetermined position on a track on the first surface of the tape;
a second read/write head for reading/writing a second gap mark having the predetermined length at a predetermined position on a track on the second surface of the tape, wherein the predetermined position of the second gap mark corresponds to the predetermined position of the first gap mark; and
a controller for controlling the read/write heads to write on and then read from the tape at the same time in synchronism as the tape moves across the heads, wherein the controller determines if a difference in the time required for the read/write heads to read the gap marks after the read/write heads have written the gap marks is within an acceptable range indicative of the read/write heads writing on and then reading from corresponding portions of the surfaces of the tape at the same time.

9. The tape drive of claim 8 wherein:
the first read/write head is positioned proximate to the first surface of the tape and the second read/write head is positioned proximate to the second surface of the tape.

10. The tape drive of claim 8 wherein:
the controller indicates a fault condition if the difference in the time required for the read/write heads to read the gap marks after the read/write heads have written the gap marks is outside of the acceptable range.

11. The tape drive of claim 8 wherein:
the first and second surfaces of the tape include track identification marks located at corresponding positions, wherein the controller controls the read/write heads to move laterally across the surfaces of the tape to the corresponding positions at the same time, wherein the controller determines if a difference in the time required for the read/write heads to read the track identification marks is within an acceptable range indicative of the read/write heads moving to corresponding portions of the surfaces of the tape in the same time period.

12. The tape drive of claim 11 wherein:
the controller indicates a fault condition if the difference in time required for the read/write heads to read the track identification marks is within the acceptable range.

13. The tape drive of claim 8 wherein:
the first and second surfaces of the tape include wrap marks and End of Tape (EOT) marks located at corresponding positions, wherein the controller determines if a difference in the time required for the read/write heads to read the wrap marks after the read/write heads have read the EOT marks is within an acceptable range indicative of the read/write heads moving to corresponding tracks on the surfaces of the tape at the same time.

14. The tape drive of claim 13 wherein:
the controller indicates a fault condition if the difference in time required for the read/write heads to read the wrap marks after the read/write heads have read the EOT marks is outside of the acceptable range.

15. A method for reading a tape having first and second surfaces, wherein a first gap mark having a predetermined length is located at a predetermined position on the first surface of the tape and a second gap mark having the predetermined length is located at a predetermined position on the second surface of the tape, wherein the predetermined position of the second gap mark corresponds to the predetermined position of the first gap mark, the method comprising:
reading the tape at the same time in synchronism as the tape moves across the heads; and
determining if a difference in the time required for the heads to read the gap marks is within an acceptable range indicative of the heads reading corresponding portions of the surfaces of the tape at the same time.

16. The method of claim 15 wherein the first and second surfaces of the tape include track identification marks located at corresponding positions, the method further comprising:
moving the heads laterally across the surfaces of the tape to the corresponding positions at the same time; and
determining if a difference in the time required for the heads to read the track identification marks is within an acceptable range indicative of the heads moving to corresponding portions of the surfaces of the tape in the same time period.

17. The method of claim 15 wherein the first and second surfaces of the tape further include wrap marks and End of Tape (EOT) marks located at corresponding positions, the method further comprising:
determining if a difference in the time required for the heads to read the wrap marks after the heads have read the EOT marks is within an acceptable range indicative of the heads moving to corresponding tracks on the surfaces of the tape at the same time.

18. A method for reading/writing on tracks of a tape having first and second surfaces, wherein the tracks are spaced apart laterally across the tape, the method comprising:
writing a first gap mark having a predetermined length at a predetermined position on a track on the first surface of the tape using a first read/write head;
writing a second gap mark having the predetermined length at a predetermined position on a track on the second surface of the tape using a second read/write head, wherein the predetermined position of the second gap mark corresponds to the predetermined position of the first gap mark, and wherein the read/write heads write on the surfaces of the tape at the same time in synchronism as the tape moves across the read/write heads;

reading the tape at the same time in synchronism as the tape moves across the heads; and determining if a difference in the time required for the read/write heads to read the gap marks after the read/write heads have written the gap marks is within an acceptable range indicative of the read/write heads writing on and then reading from corresponding portions of the surfaces of the tape at the same time.

19. The method of claim 18 wherein the first and second surfaces of the tape include track identification marks located at corresponding positions, the method further comprising:

moving the read/write heads laterally across the surfaces of the tape to the corresponding positions at the same time;

determining if a difference in the time required for the read/write heads to read the track identification marks is within an acceptable range indicative of the read/write heads moving to corresponding portions of the surfaces of the tape in the same time period.

20. The method of claim 18 wherein the first and second surfaces of the tape include wrap marks and End of Tape (EOT) marks located at corresponding positions, the method further comprising:

determining if a difference in the time required for the read/write heads to read the wrap marks after the read/write heads have read the EOT marks is within an acceptable range indicative of the read/write heads moving to corresponding tracks on the surfaces of the tape at the same time.

* * * * *